United States Patent Office
3,522,277
Patented July 28, 1970

3,522,277
3,6 - ENDOETHYLENO - 4 - CYANO - CYCLOHEX-ANEDICARBOXYLIC - (1,2) - ANHYDRIDE AND PROCESS FOR DIELS-ALDER ADDITION USING CYCLOHEXA - 3,5 - DIENE - TRANS - 1,2 - DICAR-BOXYLIC ACID
Hubert Suter and Friedrich Brunnmueller, Ludwigshafen (Rhine), Germany, assignors to Badische Anilin- & Soda-Fabrik Aktiengesellschaft, Ludwigshafen (Rhine), Germany
No Drawing. Continuation of application Ser. No. 389,464, Aug. 13, 1964. This application May 28, 1968, Ser. No. 739,947
Claims priority, application Germany, Aug. 17, 1963, B 73,159
Int. Cl. C07c 61/28, 69/74, 121/48
U.S. Cl. 260—346.6                                    6 Claims

ABSTRACT OF THE DISCLOSURE

Production of bi- or tricyclic carboxylic acid derivatives by heating cyclohexadiene-3,5-trans-1,2-dicarboxylic acid alone or with a dienophilic compound in the presence of an anhydride of a lower saturated carboxylic acid. The products produced by the process can be used as hardeners for epoxy resins and polyester resin lacquers.

---

This is a streamlined continuation of Ser. No. 389,464 now abandoned.

This invention relates to products of the Diels-Alder reaction and particularly to bicyclic carboxylic acid derivatives formed from trans-cyclohexadiene-(3,5)-dicarboxylic acid-(1,2) with dienophilic compounds, and to methods of producing them.

It is known that 1,3-dienes may be reacted with dienophilic compounds by the Diels-Alder reaction. The 1,3-dienes need not have hydrocarbon structure. On the contrary they may bear atoms or groups which are inert under the conditions of the process. Cyclic 1,3-diene dicarboxylic acids, such as cyclohexadiene-(1,3)-dicarboxylic acid-(1,4), have also been reacted as diene components. The reaction of cis-cyclohexadiene-(3,5)-dicarboxylic anhydride-(1,2) with maleic anhydride to form 3,6 - endoethylenocyclohexanetetracarboxylic acid-(1,2-4,5)-dianhydride in a melt is also known; in this method, the reaction product is not obtained in a very pure form and owing to the poor solubility of the endoethylene compound it has to be recrystallized by means of large amounts of expensive organic solvent. Adoption of the method for the trans-compound is not possible because this readily becomes rearranged into the resonance-stabilized cyclohexadiene-(2,6)-dicarboxylic acid - (1,2), which is no longer susceptible to diene synthesis.

It was therefore very surprising to find that bicyclic carboxylic acid derivatives can be advantageously obtained by diene synthesis at elevated temperature by reacting trans-cyclohexadiene-(3,5)-dicarboxylic acid-(1,2) with a dienophilic compound in the presence of an anhydride of a lower aliphatic carboxylic acid.

Trans-cyclohexadiene-(3,5)-dicarboxylic acid - (1,2) which in accordance with a prior art method is obtained by electrolytic hydrogenation of orthophthalic acid, does not react with dienophilic compounds with the formation of a diene adduct in the absence of solvents. No reaction can be observed even at temperatures up to 200° C. Diene adducts are surprisingly formed smoothly, without the said undesirable rearrangement into the 2,6-compound, when the reaction is carried out in the presence of an anhydride of a lower carboxylic acid. The dicarboxylic acid grouping is converted at the same time into the dicarboxylic anhydride grouping.

The present invention does not reside in the use of certain dienophilic components; rather the conventional dienophilic compounds having activated olefinic double bonds may be used. Examples of suitable dienophilic compounds are α,β-unsaturated carboxylic acids having three to six carbon atoms and their functional derivatives, such as anhydrides, nitriles, amides and esters. Other suitable dienophilic components are α,β-unsaturated carbonyl compounds having three to seven carbon atoms and also vinyl ethers and vinyl esters. As is well known, 1,3-dienes are also capable of reacting as dienophilic compounds. Cyclohexadiene - (3,5) - dicarboxylic acid-(1,2) can accordingly act simultaneously as a diene and as a dienophilic compound. Examples of suitable dienophilic compounds are acrylic acid, acrylonitrile, acrylamide, acrylic N,N-dimethylamide, ethyl acrylate, butyl acrylate, 2-ethylhexyl acrylate, methacrylic acid, methacrylamide, α-chloroacrylic acid, β-chloroacrylic acid, crotonic acid, maleic anhydride, itaconic acid, acrolein, crotonaldehyde, methyl vinyl ketone, butyl vinyl ketone, butadiene-(1,3) and cyclopentadiene.

It is an essential feature of the process according to this invention that the reaction be carried out in the presence of an anhydride of a lower carboxylic acid, particularly a fatty acid having one to six carbon atoms. Acetic anhydride is the preferred anhydride. The carboxylic anhydride is advantageously used in at least the molar amount with reference to cyclohexadiene-(3,5)-dicarboxylic acid-(1,2). It is recommendable to use a larger amount of the carboxylic anhydride, for example up to fifteen times the molar amount.

The process according to this invention is carried out in general at a temperature of from 50° to 150° C., advantageously at from 80° to 130° C.

In a batchwise embodiment of the process according to this invention, cyclohexadiene-(3,5)-dicarboxylic acid-(1,2), the dienophilic compound and the carboxylic anhydride are placed in a vessel fitted with a stirrer and the mixture is heated for some time, for example thirty minutes to ten hours, at the desired temperature. The diene adducts may be recovered from the reaction mixture by conventional methods. Thus the low boiling constituents may be wholly or partly distilled off, the diene adducts then usually crystallizing out. They are often obtained in such a pure form that they need not be recrystallized.

The substances obtained by the new process are for the most part new substances and may be used as hardeners for epoxy resins and polyester resin lacquers; some of them may also be used as intermediates in the production of polyesters and polyimides.

It is a particular advantage of the new process that, in the presence of carboxylic anhydrides, not only may the undesirable rearrangement of trans-cyclohexadiene-(3,5)-dicarboxylic acid-(1,2) into the 2,6-compound be avoided, but the desired endoethylene compounds may be prepared in reaction stages immediately following each other without additional measures.

The invention is illustrated by the following examples. The parts specified in the examples are parts by weight.

EXAMPLE 1

150 parts of cyclohexadiene-(3,5)-trans-dicarboxylic acid-(1,2) is dissolved in 500 parts of acetic anhydride at 80° C. The mixture is kept for six hours at 130° to 135° C. The low boiling constituents are then distilled off until the volume of the solution has been reduced to half. The diene adduct crystallizes out upon cooling. The crystals are filtered off and washed with ether. 141 parts, corresponding to 93.8% of the theory, of 1,4-endoethyleno - Δ - 5,6-bicyclo-[4,4,0]-decene-(5)-tetracarboxylic acid-(2,3-7,8) dianhydride is obtained having a melting point of 272° to 273° C. The adduct may be recrystallized from dioxane.

*Analysis.*—Calculated for $C_{16}H_{12}O_6$, molecular weight 300, (percent): C, 64.0; H, 4.0; O, 32.0. Found (percent): C, 63.6; H, 4.1; O, 32.3.

The yield is 91% of the theory when 650 parts of propionic anhydride is used instead of acetic anhydride under otherwise the same conditions.

EXAMPLE 2

1000 parts of acetic anhydride is added to 168 parts of cyclohexadiene-(3,5)-Δ-trans-dicarboxylic acid-(1,2) and 72 parts of acrylic acid. The mixture is heated to 80° C., a homogeneous solution thus being formed. The temperature is then kept at 125° to 130° C. for two hours. The low boiling constituents are distilled off and the residue is distilled under subatmospheric pressure. 203 parts (corresponding to 92.5% of the theory) of 3,6-endoethyleno - 4 - carboxycyclo-hexanedicarboxylic acid-(1,2)-anhydride is obtained having a boiling point (at 0.5 mm. Hg) of 250° C. The product forms a crystalline solid and after having been recrystallized from a mixture of equal parts of chlorobenzene and o-dichlorobenzene, it has a melting point of 176° to 178° C.

*Analysis.*—Calculated for $C_{11}H_{10}O_5$, molecular weight 222, (percent): C, 59; H, 4.5; O, 36.1; hydrogenation number 114. Found (percent): C, 59.5; H, 4.6; O, 36.0; hydrogenation number 110.

EXAMPLE 3

1000 parts of acetic anhydride is added to 168 parts of cyclohexadiene-(3,5)-trans-dicarboxylic acid-(1,2) and 128 parts of butyl acrylate and the mixture heated to 80° C. while stirring. It is then heated for one hour at 125° to 130° C. The further procedure of Example 2 is followed and 256 parts (corresponding to 92% of the theory) of 3,6 - endoethyleno-4-carbobutoxycyclohexanedicarboxylic acid-(1,2)-anhydride is obtained having a boiling point (at 0.5 mm. Hg) of 180° to 200° C. It is a colorless liquid.

*Analysis.*—Calculated for $C_{15}H_{18}O_3$, molecular weight 278, (percent): C, 64.7; H, 6.4; O, 28.8. Found (percent): C, 64.8; H, 6.2; O, 29.2.

By reacting, instead of butyl acrylate, acrylic esters of other alkanols, e.g., of methanol, ethanol, 2-ethylhexanol or lauryl alcohol, the corresponding 3,6-endoethyleno-4-carbalkoxycyclohexanedicarboxylic acid-(1,2) anhydrides are obtained.

EXAMPLE 4

1000 parts of acetic anhydride is added to 168 parts of cyclohexadiene-(3,5)-trans-dicarboxylic acid-(1,2) and 212 parts of acrylonitrile. The mixture is heated to 80° C. until a clear solution has been formed. The temperature is then increased to 115° C. and the mixture kept under reflux for six hours. Low boiling constituents are then distilled off until the volume of the mixture has been halved. Upon cooling, the diene adduct is deposited as a crystalline precipitate. It is filtered off, washed with cold methanol and dried at 60° C. By concentrating the mother liquor again to 50% of its volume, a further quantity of diene adduct is recovered and this is separated, washed and dried in the same way as the main amount. A total of 182 parts (corresponding to 91% of the theory) of 3,6 - endoethyleno - 4-cyanocyclohexanedicarboxylic acid-(1,2)-anhydride is obtained having a boiling point of 189° to 190° C.

*Analysis.*—Calculated for $C_{11}H_9O_3N$, molecular weight 203, (percent): C, 64.9; H, 4.4; O, 23.7; N, 6.9. Found (percent): C, 64.8; H, 4.5; O, 24.1; N, 6.7.

EXAMPLE 5

300 parts of acetic anhydride is added to 42 parts of trans-cyclohexadiene-(3,5)-dicarboxylic acid-(1,2) and 24.5 parts of maleic anhydride and the whole heated to 80° C. while stirring. When this temperature has been reached, a clear solution has been formed and this is further heated to 125° C. The said temperature is held for three hours and the first crystals separate after ten minutes; the mixture is then cooled to room temperature and filtered. The filtrate is concentrated to one third of its original volume, the precipitate formed by cooling is again filtered off, and this operation is again repeated with the filtrate. Finally the thickened oily residue is caused to crystallize by adding acetone, the combined fractions of crystals are suspended in this solvent, the crystals are suction filtered and dried.

The melting point of the 3,6-endoethylenocyclohexane-tetracarboxylic acid-(1,2–4,5)-dianhydride is 351° to 352° C. The yield is 56.1 parts, corresponding to 90.5% of the theory.

*Analytical values.*—Calc'd for C, 58.2; H, 3.2; O, 38.7 (percent). Found (percent): C, 58.4; H, 3.0; O, 38.6.

We claim:
1. A process for the production of bicyclic carboxylic acid derivatives which comprises: heating cyclohexa-3,5-diene-trans-1,2-dicarboxylic acid and a member selected from the group consisting of
   (a) α,β unsaturated mono- or dicarboxylic acid of three to six carbon atoms, and an anhydride, amide or ester of such an acid,
   (b) α,β unsaturated carbonyl compound of three to seven carbon atoms, and
   (c) butadiene or cyclopentadiene to a temperature of from 50 to 150° C. in the presence of an anhydride of a lower aliphatic carboxylic acid.

2. A process as in claim 1 wherein said member is maleic anhydride.

3. A process as in claim 1 wherein 1 to 15 mols of the anhydride of the lower aliphatic carboxylic acid is present per mol of the cyclohexadiene-dicarboxylic acid.

4. A process as in claim 1 wherein said anhydride of a lower aliphatic carboxylic acid is acetic anhydride.

5. A process as in claim 1 wherein said anhydride of a lower aliphatic carboxylic acid is an anhydride of a lower monocarboxylic acid of 1 to 6 carbon atoms.

6. 3,6 - endoethyleno - 4 - cyanocyclohexanedicarboxylic-(1,2)-anhydride.

References Cited

UNITED STATES PATENTS 2,813,135   11/1957   Johnson et al. _____ 260—666

OTHER REFERENCES

Bergmann et al., J.A.C.S., vol. 65, 1413 (1943).
Baeyer, Ann. (1892), vol. 269, pp. 147–149.
Diels and Alder, Ann., 1931, vol. 490, p. 226.
Alder et al., Chem. Abstracts, vol. 50 (1956), p. 10058.
Bailey et al., J. Org. Chem., vol. 27, May 1962, p. 1853.
Smith et al., J. Org. Chem., vol. 28, December 1963, p. 3327.

ALEX MAZEL, Primary Examiner

B. I. DENTZ, Assistant Examiner

U. S. Cl. X.R.

260—346.3, 514, 468, 557, 2, 75, 78